United States Patent
Kludt et al.

(10) Patent No.: US 8,046,017 B2
(45) Date of Patent: Oct. 25, 2011

(54) METHOD AND APPARATUS FOR RANDOM ACCESS CHANNEL PROBE INITIALIZATION USING TRANSMIT DIVERSITY

(75) Inventors: Kenneth Kludt, Bedminster, NJ (US); Sherwin J. Wang, Towaco, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 873 days.

(21) Appl. No.: 12/042,560

(22) Filed: Mar. 5, 2008

(65) Prior Publication Data

US 2008/0227406 A1    Sep. 18, 2008

Related U.S. Application Data

(60) Provisional application No. 60/918,068, filed on Mar. 15, 2007.

(51) Int. Cl.
*H04B 7/00* (2006.01)
*H04B 17/00* (2006.01)

(52) U.S. Cl. .................. 455/515; 455/115.1; 455/115.2

(58) Field of Classification Search .................. 455/515, 455/522, 516, 517, 434, 101, 115.1, 115.2; 370/310, 318, 329, 341
See application file for complete search history.

(56) References Cited

U.S. PATENT DOCUMENTS

| | | | |
|---|---|---|---|
| 5,642,353 A | 6/1997 | Roy, III et al. | |
| 5,832,044 A | 11/1998 | Sousa et al. | |
| 5,983,112 A | 11/1999 | Kay | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,810,264 B1 | 10/2004 | Park et al. | |
| 6,859,643 B1 | 2/2005 | Ma et al. | |
| 6,882,228 B2 | 4/2005 | Rofougaran | |
| 7,058,400 B2 * | 6/2006 | Brooks | ........................ 455/424 |
| 7,321,636 B2 | 1/2008 | Harel et al. | |

(Continued)

FOREIGN PATENT DOCUMENTS

EP    0 986 193    3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Sonny Trinh
(74) *Attorney, Agent, or Firm* — Pearl Cohen Zedek Latzer, LLP (57) ABSTRACT

Embodiments of the present invention extend the benefits of mobile transmit diversity to the initialization phase of communication with a base station over a random access channel. According to a method of the invention, the transmitter may attempt to initiate communication with a receiver by varying a transmit diversity parameter, for example, phase difference, in addition to or instead of varying power settings.

20 Claims, 6 Drawing Sheets

U.S. PATENT DOCUMENTS

| | | | |
|---|---|---|---|
| 7,327,801 B2 * | 2/2008 | Harel et al. | 375/267 |
| 7,515,559 B2 * | 4/2009 | Koo et al. | 370/328 |
| 7,792,207 B2 * | 9/2010 | Harel et al. | 375/267 |
| 7,813,753 B2 * | 10/2010 | Santhanam | 455/522 |
| 2003/0112880 A1 | 6/2003 | Walton et al. | |
| 2004/0048584 A1 | 3/2004 | Vaidyanathan et al. | |
| 2004/0082356 A1 | 4/2004 | Walton et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |
| 2007/0149235 A1 * | 6/2007 | Chin et al. | 455/522 |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |
| WO | WO 2006/124951 | 11/2006 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US2008/057120 mailed Aug. 22, 2008.

* cited by examiner

METHOD AND APPARATUS FOR RANDOM ACCESS CHANNEL PROBE INITIALIZATION USING TRANSMIT DIVERSITY

CROSS-REFERENCE TO RELATED APPLICATIONS

This application claims benefit of U.S. Provisional Patent Application Ser. No. 60/918,068, entitled "Method, Apparatus and System for Transmit Diversity Using Random Access Channel" and filed Mar. 15, 2007, the entirety of which is incorporated by reference herein.

FIELD OF THE INVENTION

This invention relates generally to the field of wireless communications and more specifically to controlling transmit diversity parameters prior to and during connection of a transmit diversity mobile communication device to a base station.

BACKGROUND OF THE INVENTION

In transmit diversity systems, one of the advantageous features of a mobile transmit diversity communication device is an extension of operating range. This effect may be an outcome of forming a beam that exhibits a higher Effective Radiated Power (ERP) than a conventional transmitter that does not employ transmit diversity. This advantageous feature may be enhanced by a successful and/or efficient beamforming process, for instance, in a closed loop mechanism, on the provision of feedback from the receiver to the transmit diversity transmitter.

Generally, in systems of communication between a mobile handset, for example, a mobile telephone, personal digital assistant (PDA), laptop computer, etc. and a base station over a random access channel, there is typically a protocol for the mobile device to initiate communication with the base station. Typically, the mobile device will attempt to access a network by emitting an access probe, also known as a preamble signal. If no response is received from the base station, the mobile device may repeat transmission of the access probe with increased power, and repeat increasing power of the probes until an end condition is reached. An end condition may be receiving acknowledgement, or it may be when the maximum allowed probe power is reached, or when the maximum allowed number of probes is sent. If an acknowledgment is not received, the mobile device will typically declare the access attempt a failure and try again, either automatically or manually.

Therefore, in cellular communication systems, the mobile transmitter may begin a registration process to the network, but the base station has not yet registered the existence of the mobile transmitter. In some implementations of transmit diversity, the transmitter may require feedback from the receiver, e.g., a base station, in order to optimally adjust a phase difference or other diversity parameter. However, in the absence of successful registration, the base station may not provide the feedback required to close the loop, as is advantageous for purposes of transmit diversity. This lack of feedback may render inefficient the proper beamforming resultant ERP and reduce the potential range extension. This effect may be further adversely affected by the usage of multiple sub-power power amplifiers, which may possibly be used for saving or reducing current consumption, when beamforming is successfully implemented.

As described in prior patent applications of the assignee of the present invention, a mobile transmit diversity (MTD) device may use two antennas simultaneously transmitting with a transmit diversity parameter, for example, a phase difference or a power ratio between at least two antennas. In one embodiment, two "diversity power amplifiers" may be used to save the current consumption for the mobile device, as described, for example, in US Patent Publication No. 2003/0002594, the entire contents of which are incorporated herein by reference. Use of mobile transmit diversity may permit extending the effective range of a mobile device from a base station using the same power as a non-diverse transmission device.

The maximum power of this diversity power amplifier can be half or even quarter of the maximum power of the "regular" power amplifier. However, when a mobile transmitter accesses the wireless network, it may need the maximum power from the mobile power amplifier to get base station's attention (e.g., at the cell edge). There is therefore a need for an efficient initial negotiation process for a mobile transmit diversity communication device.

SUMMARY OF EMBODIMENTS OF THE INVENTION

As discussed above, the initial negotiation process between the mobile transmitter and the network is referred to as PROBE or random access channel (RACH), and may be performed using progressively increasing power levels and variable durations and time limits, and is intended to establish a normal mode of communications rapidly and efficiently, and with minimal or no disruption to other users in the cell.

Embodiments of the present invention describe a method of enabling successful achievement of the range extension even during a period where feedback from the network is unavailable by combining increases in transmission power with variations in a transmit diversity parameter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Embodiments of the invention may be used in communication systems in connection with mobile transmit diversity devices. A communication system may include a mobile transmitter, also referred to as a modifying communication device, that that adjusts a nominal value of a transmit diversity parameter, for example, a phase difference and/or a power ratio between a signal transmitted on a first antenna and a second antenna. Although the embodiments described in the present application are described as using two antennas, it will be recognized that the present invention is equally applicable to transmit diversity systems and devices having more than two antennas.

The present invention may be applicable in any communication network that uses a random access channel to initiate communication between a mobile device and a second communication device, including but not limited to a base station. Networks may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Communication devices in a network may use any suitable multiple access technology, for example, a code division multiple access (CDMA) technology. According to one embodiment, the network may operate according to a CDMA 2000 telecommunications technology that uses a single CDMA channel. As an example, a CDMA 2000 high rate data packet technology, such as the Evolution Data Optimized (EvDO) technology may be used.

The network may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of network, for example, a mobile communication device, may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

The communication network may include one or more mobile or modifying communication devices and one or more other communication devices, for example base stations, that communicate via a wireless link. A mobile communication device unit may comprise any device operable to communicate with a base station, for example, a personal digital assistant (PDA), a cellular telephone, a mobile handset, a laptop computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

According to embodiments of the invention, the mobile communication device may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

As described more fully below, according to embodiments of the present invention, the mobile communication device may include a processor and a transmit/receive module that calculate and produce one or more signals for transmission over at least first and second antennas.

According to one embodiment, modifying a signal may refer to modifying a signal feature. For example, a signal may be transmitted by the two antennas using a modified signal feature, or a different value of a transmit diversity parameter. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device. According to one embodiment, modifying a signal may be described as adjusting a nominal value of a transmit diversity parameter.

According to embodiments of the invention, transmit diversity may be used to efficiently negotiate initial contact with a base station even substantially without a transmission quality feedback signal from the base station pertaining to the transmit diversity. A diversity parameter may be a parameter distinguishing between the transmission on any two antennas, for example a difference in transmission phase on the two antennas, or a ratio of transmission power on the two antennas. It will be understood that although examples are provided in the present application pertaining to phase difference between two antennas, the invention is applicable using the same principles to varying any transmit diversity parameter, including power ratio, during initial negotiation with the base station on a random access channel.

Figure 1:
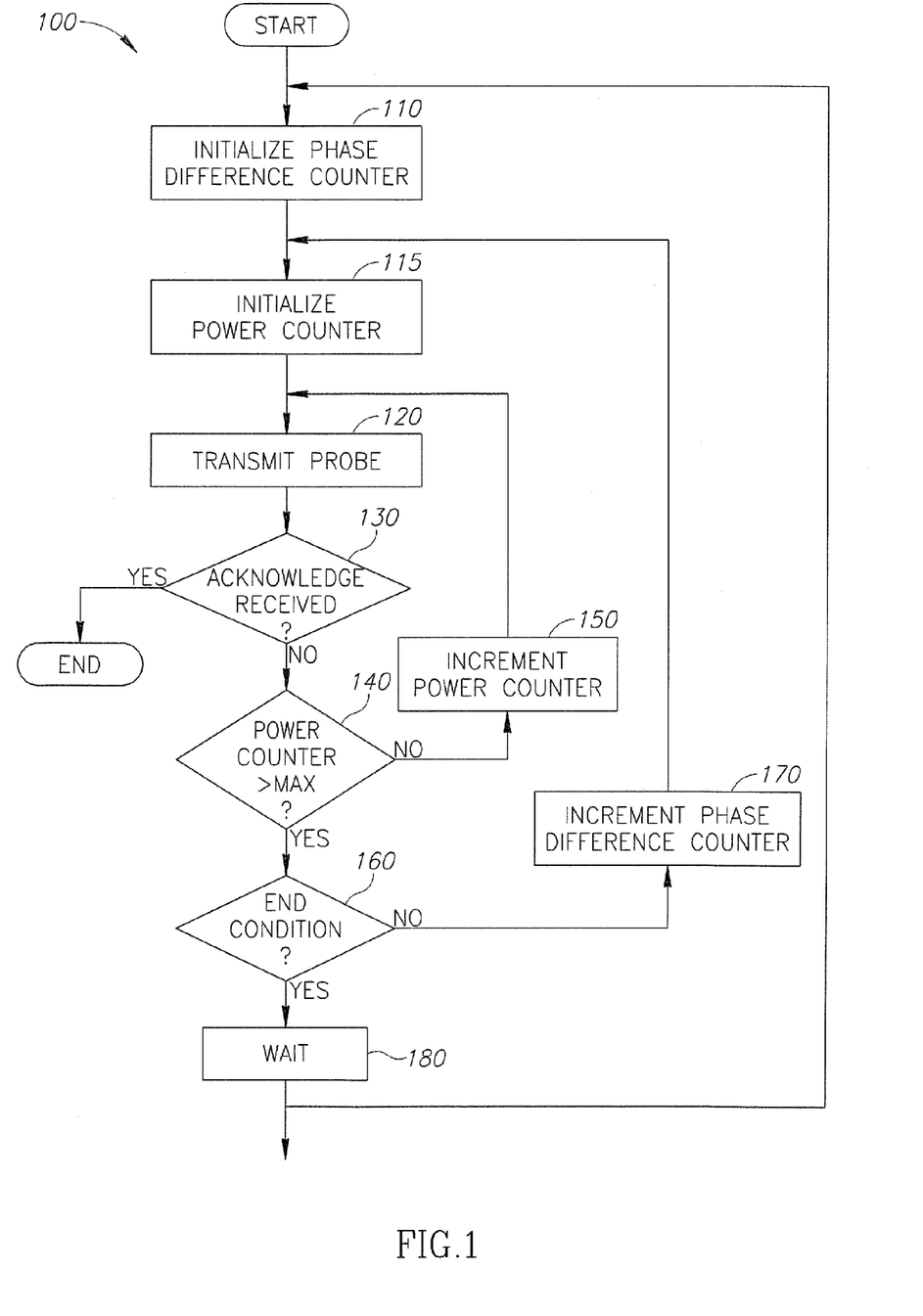
FIG. 1 is a schematic flow chart diagram of a method in accordance with embodiments of the present invention.

FIG. 2 is a schematic flow diagram of a method 100 in accordance with an embodiment of the invention. A phase difference counter may be initialized (110). An initial value for the phase difference may be any arbitrary initial value, but typically not 180 degrees. A power setting counter may be initialized (115). Power may be initialized to a suitable low power setting in accordance with the relevant protocol. Either or both of the counters may be a parameter or an actual value.

Using these initial values, a probe may be transmitted (120). At step 130, if acknowledgement is received from the base station, the initialization may end and regular transmission of data signals may proceed; otherwise, a power counter may be assessed to determine if other power settings may be attempted (140). If the maximum value of the power counter has not been reached, the power counter or value may be incremented (150) and a transmit probe sent using the revised power setting (120). The power counter may be incremented by a pre-defined value or increment.

Upon reaching a maximum limit for power setting, for example, a maximum power allowed by the system, or a maximum number of attempts allowed, it may optionally be determined whether an end condition has been reached, for example, a maximum total number of probe transmissions, or a total number of phase differences totaling a multiple of 360°, before indicating failure. Alternately, the end condition may be omitted and the method may proceed directly to step 170, for example, after waiting a brief period. If no end condition has been reached, the phase difference counter may be incremented (170), for example, as calculated to optimize probability of improving transmission. In one embodiment, the phase difference increment may be, for example, 100 degrees. The power counter may be re-initialized (115), and a probe transmitted with the new values (120). If an end condition has been reached, the method may wait in accordance with the protocol requirements (180), and the method may be restarted with initial parameters (110). It will be recognized that in some embodiments of the invention, phase difference counter may not be initialized, but the phase difference may simply continue, and accordingly, the loop may return at 115. In some embodiments of the invention, the phase difference counter may only be initialized upon powering up or turning on the mobile transmitter.

Figure 2:
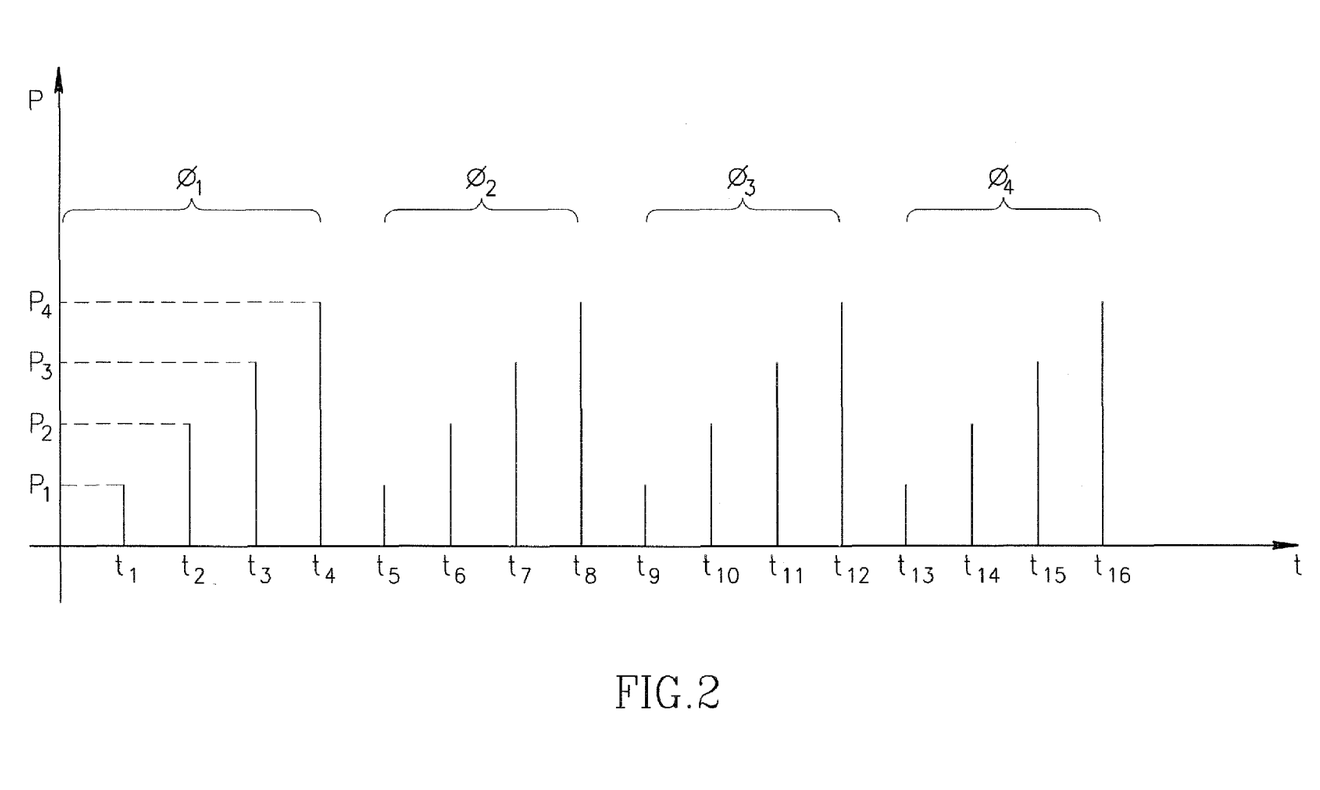
FIG. 2 is a schematic time diagram of a sequence of probe signals according to embodiments of the present invention.

FIG. 2 depicts a sequence of probe transmissions in accordance with the present invention. At time t1, a probe is transmitted at a first power level P1 and at a first phase difference φ1. Upon failing to receive acknowledgement, the transmitter transmits probes having phase difference φ1 and with power settings P2, P3 and P4. In the embodiment depicted, after the probe at time t4 is transmitted, the power counter has reached the maximum, and without any acknowledgment, the transmitter proceeds to transmit probe having power level P1 and phase difference φ2. When acknowledgment is not received, probes are sent with power differences P2, P3 and P4 and phase difference φ2. This process may repeat until acknowledgment is received or a maximum number of phase differences, e.g., 360° rotation is reached and exhausted without acknowledgement.

It will be recognized that by varying phase difference, an optimal phase difference may be obtained, or if not, the power may be increased accordingly. That is, changing phase difference may have the effect of changing the orientation of the signal beam and eventually reaching the base station with the enough transmit power. In an embodiment of the invention, the amount of the increment in phase difference may be chosen such that the phase difference between the two paths will not be repeated within several access procedures, e.g., six procedures.

Figure 3:
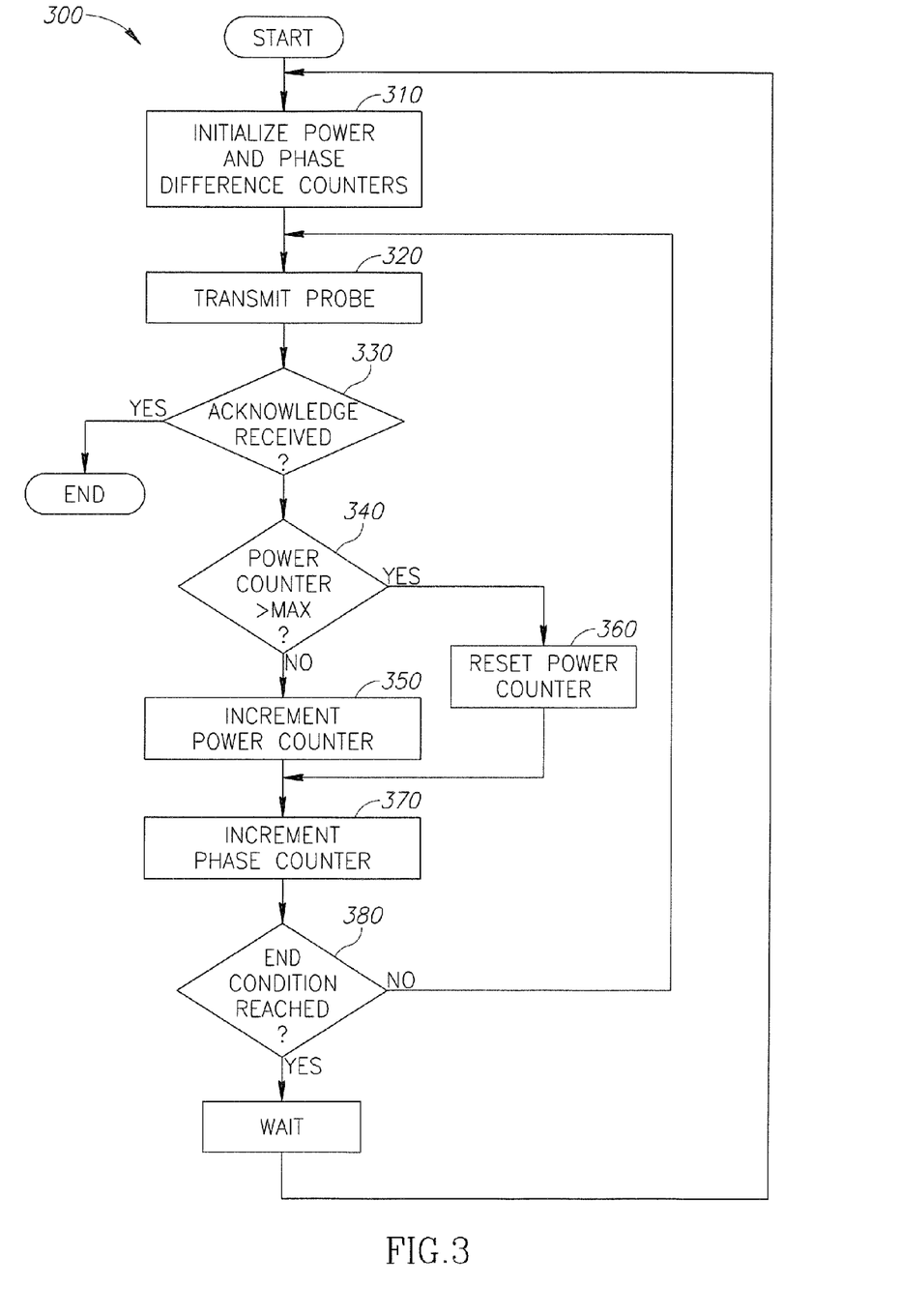
FIG. 3 is a schematic flow chart diagram of a method in accordance with embodiments of the present invention.

FIG. 3 is a schematic flow diagram of a method 300 in accordance with an embodiment of the invention. Power and phase difference values or counters may be initialized at the start of the method (310). An initial phase difference may be any arbitrary initial value, but typically not 180 degrees. Power may be initialized to a suitable low power setting in accordance with the relevant protocol.

Using these initial values, a probe may be transmitted (320). At step 330, if acknowledgement is received from the base station, the initialization may end and regular transmission of data signals may proceed; otherwise, a power setting counter may be assessed to determine if other power settings may be attempted (340). If the maximum value of the power setting counter has not been reached, the power setting counter or value may be incremented (350); if the maximum power setting counter has been reached, the power counter may be reset (360). Then, the phase difference may be incremented by a pre-defined value that may optimize probability of improving transmission (370). In one embodiment, the phase difference increment may be, for example, 100 degrees.

It may be determined whether a maximum or end condition has been reached, for example, whether power and phase difference settings have been exhausted (380). If not, a probe may be transmitted (320) with the newly adjusted values for phase difference and power.

Figure 4:
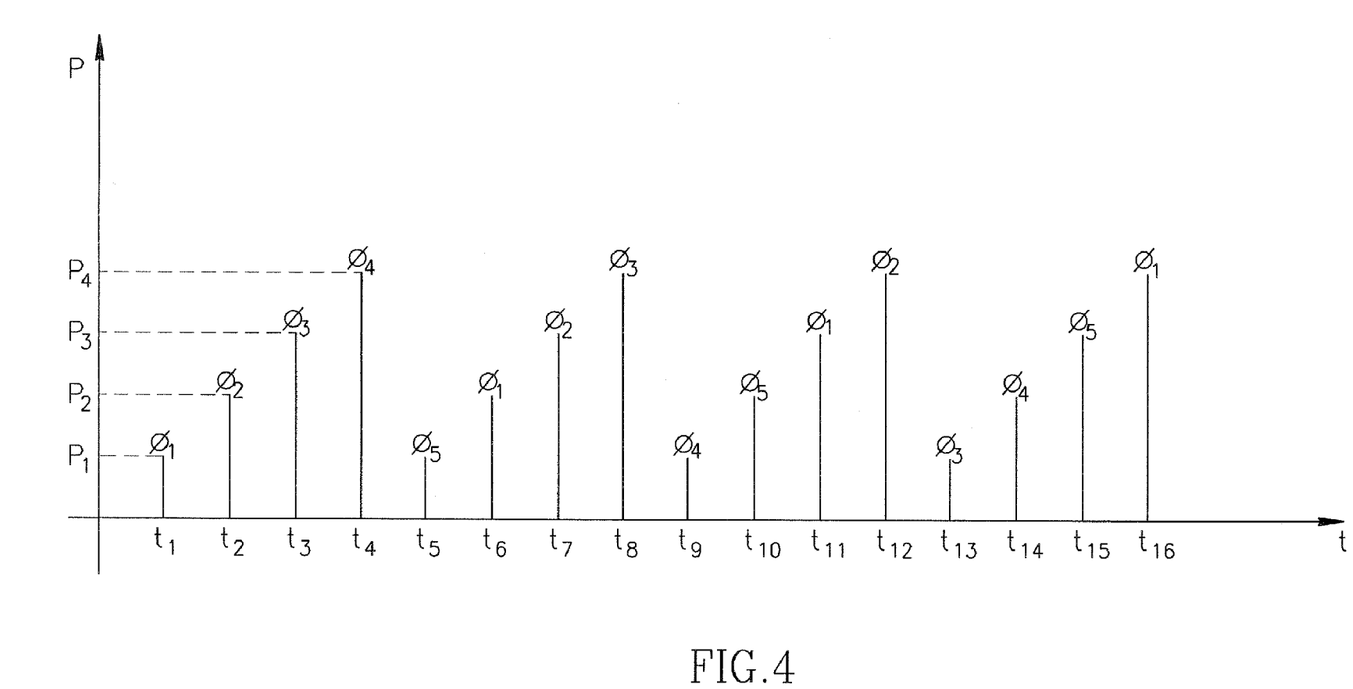
FIG. 4 is a schematic time diagram of a sequence of probe signals according to embodiments of the present invention.

FIG. 4 depicts a sequence of probe transmissions in accordance with the present invention. At time t1, a probe is transmitted at a first power level P1 and at a first phase difference φ1. Upon failing to receive acknowledgement, the transmitter transmits probes having power P2, and with phase difference φ2. Then, upon failing to receive acknowledgment, the transmitter may transmit probe having power P3 and phase difference φ3, etc. It will be recognized that in the embodiment depicted, the phase difference and power levels have different periodicities in order not to repeat the same power and phase difference settings. It will be recognized that many other periodicities may be implemented within the scope of the present invention.

Figure 5:
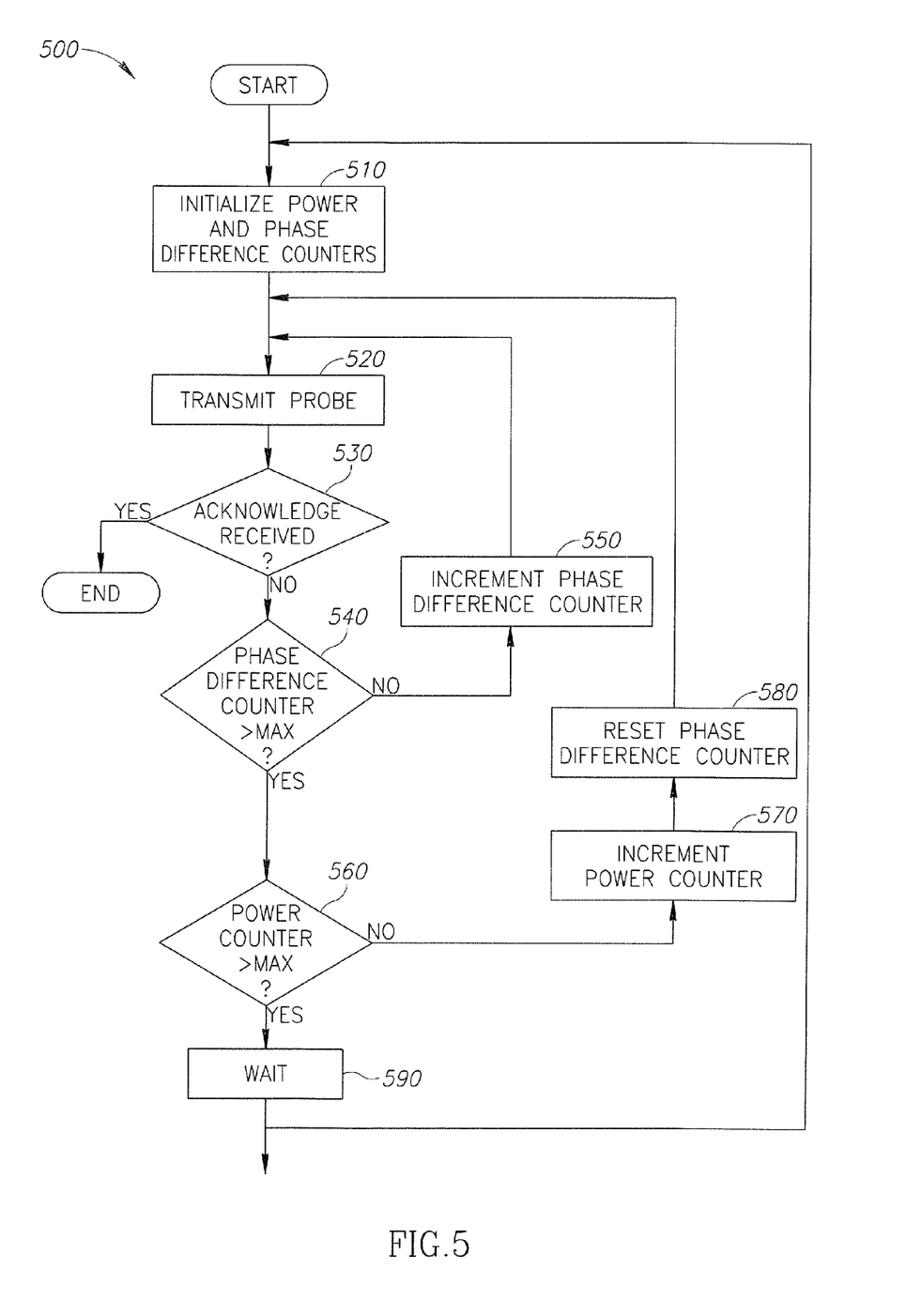
FIG. 5 is a schematic flow chart diagram of a method in accordance with embodiments of the present invention.

FIG. 5 is a schematic flow diagram of a method 500 in accordance with an embodiment of the invention. Power and phase difference values or counters may be initialized at the start of the method (510). An initial phase difference may be any arbitrary initial value, but typically not 180 degrees. Power may be initialized to a suitable low power setting in accordance with the relevant protocol.

Using these initial values, a probe may be transmitted (520). At step 530, if acknowledgement is received from the base station, the initialization may end and regular transmission of data signals may proceed; otherwise, a phase difference counter may be assessed to determine if other phase differences may be attempted (540). If the maximum value of the phase difference counter has not been reached, the phase difference counter or value may be incremented (550) and a transmit probe sent using the revised phase difference (520). The phase difference may be incremented by a pre-defined value that may optimize probability of improving transmission. In one embodiment, the phase difference increment may be, for example, 100 degrees.

Upon reaching a maximum limit for phase difference adjustments, for example, a maximum number of attempts at the given power, it may be determined whether the power has reached a maximum value (560). If not, the power may be incremented (570), the phase difference counter may be reset if relevant (580), and a probe transmitted with the new values (520). If the maximum power or other condition has been reached, the method may wait in accordance with the protocol requirements (590), and the method restarted with initial parameters (510).

Figure 6:
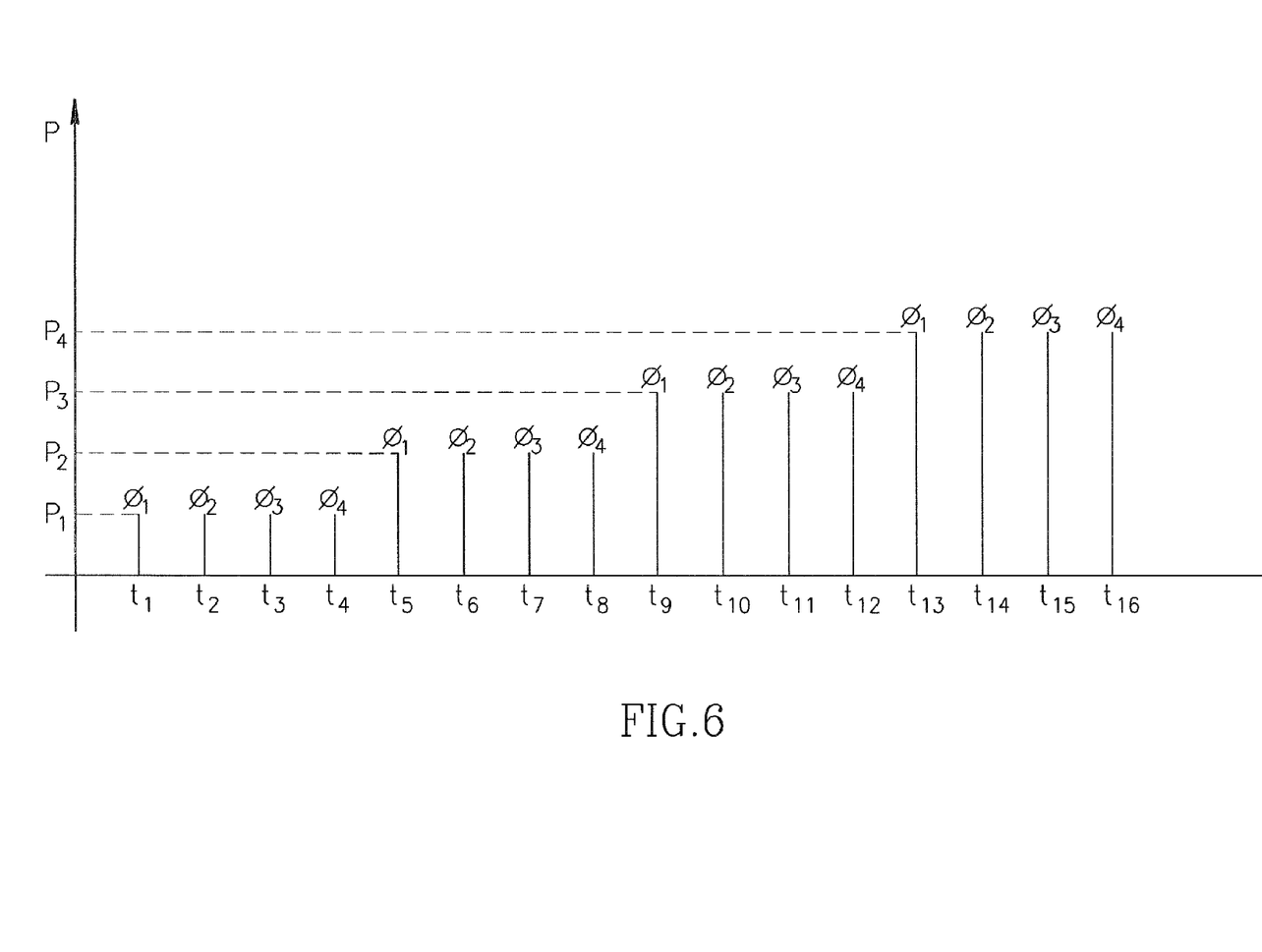
FIG. 6 is a schematic time diagram of a sequence of probe signals according to embodiments of the present invention.

FIG. 6 depicts a sequence of probe transmissions in accordance with the present invention. At time t1, a probe is transmitted at a first power level P1 and at a first phase difference φ1. Upon failing to receive acknowledgement, the transmitter transmits probes having power P1, and with phase differences φ2, φ3, and φ4. In the embodiment depicted, after probe φ4, the phase increment counter has reached the maximum, and without any acknowledgment, the transmitter proceeds to transmit probe having power level P2 and phase difference φ1. When acknowledgment is not received, probes are sent with power level P2 and phase differences φ2, φ3, and φ4. This process may repeat until acknowledgment is received or a maximum power level, e.g., P4 is reached and exhausted.

It will be recognized that implementing the above method or another method in accordance with the present invention may demand more probe attempts than is typical or even permitted under the present protocol. Accordingly, in order to permit the method of the present invention to run its full course, it may be desirable or necessary to coordinate the increased number of attempted probes with the base station.

Certain embodiments of the invention may include none, some, or all of the above technical advantages. One or more other technical advantages may be readily apparent to one skilled in the art from the figures, descriptions, and claims included herein.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, any mobile communication protocol may be used, for example, CDMA or other types of protocols. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Embodiments of this invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of initiating communication between a first communication device and a second communication device comprising:
    transmitting from the first communication device a first probe signal on a random access channel using at least two antennas, wherein transmissions of the first probe signal on the two antennas differ by a first value of a transmit diversity parameter; and
    if acknowledgement is not received from the second communication device, then transmitting from the first communication device a second probe signal on a random access channel using at least two antennas, wherein transmissions of the second probe signal on the two antennas differ by a second value of the transmit diversity parameter.

2. The method of claim 1, comprising
    transmitting from the first communication device a first sequence of probe signals on a random access channel using at least two antennas, said first sequence including the first probe signal,
        wherein for the first sequence, transmissions of each the probe signals on the two antennas differ by the first value of the transmit diversity parameter, and
        wherein each subsequent probe signal in the first sequence is transmitted with a transmission power greater than a transmission power of the previous probe signal in the first sequence until a maximum allowed transmission power is reached; and
    if acknowledgement is not received from the second communication device, then transmitting from the first communication device a second sequence of probe signals on a random access channel using at least two antennas, said second sequence including the second probe signal,
        wherein for the second sequence, transmissions of each the probe signals on the two antennas differ by the second value of the transmit diversity parameter, and
        wherein each subsequent probe signal in the second sequence is transmitted with a transmission power greater than a transmission power of the previous probe signal in the second sequence until the maximum allowed transmission power is reached.

3. The method of claim 2, wherein a transmission power of a last probe signal in the first sequence is greater than a transmission power of a first probe signal in the second sequence.

4. The method of claim 2, wherein said transmit diversity parameter is a phase difference, said method comprising transmitting a plurality of sequences of probe signals each of said sequences using a single respective phase difference until an end condition is attained.

5. The method of claim 1, wherein a transmission power of said second probe signal is greater than a transmission power of said first signal.

6. The method of claim 1, comprising
    transmitting from the first communication device a first sequence of probe signals on a random access channel using at least two antennas, said first sequence including the first probe signal,
        wherein for the first sequence, transmissions of each the probe signals on the two antennas differ by respectively different values of the transmit diversity parameter, and
        wherein each subsequent probe signal in the first sequence is transmitted with a transmission power greater than a transmission power of the previous probe signal in the first sequence until a maximum allowed transmission power is reached; and
    if acknowledgement is not received from the second communication device, then transmitting from the first communication device a second sequence of probe signals on a random access channel using at least two antennas, said second sequence including the second probe signal,
        wherein for the second sequence, transmissions of each the probe signals on the two antennas differ by respectively different values of the transmit diversity parameter, and
        wherein each subsequent probe signal in the second sequence is transmitted with a transmission power greater than a transmission power of the previous probe signal in the second sequence until the maximum allowed transmission power is reached.

7. The method of claim 6, wherein probe signals having corresponding transmission power in said first and second sequences have different transmit diversity parameters.

8. The method of claim 1, comprising
transmitting from the first communication device a first sequence of probe signals on a random access channel using at least two antennas, said first sequence including the first probe signal,
  wherein for the first sequence, transmissions of each the probe signals on the two antennas have different values of the transmit diversity parameter, and
  wherein each probe signal in the first sequence is transmitted with a first transmission power; and
if acknowledgement is not received from the second communication device, then transmitting from the first communication device a second sequence of probe signals on a random access channel using at least two antennas, said second sequence including the second probe signal,
  wherein for the second sequence, transmissions of each the probe signals on the two antennas have different values of the transmit diversity parameter, and
  wherein each probe signal in the second sequence is transmitted with a second transmission power.

9. The method of claim 8, comprising transmitting a plurality of sequences until a maximum transmission power is reached.

10. The method of claim 1, comprising transmitting a plurality of probe signals until a maximum allowed number of probe signals is reached.

11. A mobile communication device comprising:
first and second antennas; and
a processor to:
  transmit on the first and second antennas a first probe signal on a random access channel, wherein transmissions of the first probe signal on the first and second antennas differ by a first value of a transmit diversity parameter, and
  if acknowledgement is not received from a second communication device, transmit on the first and second antennas a second probe signal on a random access channel, wherein transmissions of the second probe signal on the first and second antennas differ by a second value of the transmit diversity parameter.

12. The mobile communication device of claim 11, wherein said processor is to:
transmit a first sequence of probe signals on a random access channel using said first and second antennas, said first sequence including the first probe signal,
  wherein for the first sequence, transmissions of each the probe signals on the two antennas differ by the first value of the transmit diversity parameter, and
  wherein each subsequent probe signal in the first sequence is transmitted with a transmission power greater than a transmission power of the previous probe signal in the first sequence until a maximum allowed transmission power is reached; and
if acknowledgement is not received from the second communication device, transmit a second sequence of probe signals on a random access channel using said first and second antennas, said second sequence including the second probe signal,
  wherein for the second sequence, transmissions of each the probe signals on the two antennas differ by the second value of the transmit diversity parameter, and
  wherein each subsequent probe signal in the second sequence is transmitted with a transmission power greater than a transmission power of the previous probe signal in the second sequence until the maximum allowed transmission power is reached.

13. The mobile communication device of claim 12, wherein a transmission power of a last probe signal in the first sequence is greater than a transmission power of a first probe signal in the second sequence.

14. The mobile communication device of claim 12, wherein said transmit diversity parameter is a phase difference, said processor adapted to transmit a plurality of sequences of probe signals each of said sequences using a single respective phase difference until an end condition is attained.

15. The mobile communication device of claim 11, wherein a transmission power of said second probe signal is greater than a transmission power of said first signal.

16. The mobile communication device of claim 11, wherein said processor is to:
transmit on said first and second antennas a first sequence of probe signals on a random access channel, said first sequence including the first probe signal,
  wherein for the first sequence, transmissions of each the probe signals on the two antennas differ by respectively different values of the transmit diversity parameter, and
  wherein each subsequent probe signal in the first sequence is transmitted with a transmission power greater than a transmission power of the previous probe signal in the first sequence until a maximum allowed transmission power is reached; and
if acknowledgement is not received from the second communication device, transmit on said first and second antennas a second sequence of probe signals on a random access channel, said second sequence including the second probe signal,
  wherein for the second sequence, transmissions of each the probe signals on the two antennas differ by respectively different values of the transmit diversity parameter, and
  wherein each subsequent probe signal in the second sequence is transmitted with a transmission power greater than a transmission power of the previous probe signal in the second sequence until the maximum transmission power is reached.

17. The mobile communication device of claim 16, wherein probe signals having corresponding transmission power in said first and second sequences have different transmit diversity parameters.

18. The mobile communication device of claim 11, wherein said processor is to:
transmit on said first and second antennas a first sequence of probe signals on a random access channel, said first sequence including the first probe signal,
  wherein for the first sequence, transmissions of each the probe signals on the two antennas have different values of the transmit diversity parameter, and
  wherein each probe signal in the first sequence is transmitted with a first transmission power; and
if acknowledgement is not received from the second communication device, transmit on said first and second antennas a second sequence of probe signals on a random access channel, said second sequence including the second probe signal, wherein for the second sequence, transmissions of each the probe signals on the two antennas have different values of the transmit diversity parameter, and wherein each probe signal in the second sequence is transmitted with a second transmission power.

19. The mobile communication device of claim 18, wherein said processor is to transmit a plurality of sequences until a maximum transmission power is reached.

20. The mobile communication device of claim 11, wherein said processor is to transmit a plurality of probe signals until a maximum allowed number of probe signals is reached.

* * * * *